(12) United States Patent
Liu

(10) Patent No.: US 12,143,400 B2
(45) Date of Patent: Nov. 12, 2024

(54) BLOCKCHAIN-BASED MESSAGE PROCESSING METHOD AND APPARATUS, DEVICE, AND STORAGE MEDIUM

(71) Applicant: Tencent Technology (Shenzhen) Company Limited, Shenzhen (CN)

(72) Inventor: Pan Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 360 days.

(21) Appl. No.: 17/719,176

(22) Filed: Apr. 12, 2022

(65) Prior Publication Data
US 2022/0239668 A1 Jul. 28, 2022

Related U.S. Application Data

(63) Continuation of application No. PCT/CN2021/090914, filed on Apr. 29, 2021.

(30) Foreign Application Priority Data

May 22, 2020 (CN) .......................... 202010438631.7

(51) Int. Cl.
*H04L 9/40* (2022.01)
(52) U.S. Cl.
CPC ........ *H04L 63/123* (2013.01); *H04L 63/0245* (2013.01)
(58) Field of Classification Search
CPC ............... H04L 63/123; H04L 63/0245; H04L 63/0218; H04L 63/101; H04L 63/1425;
(Continued)

(56) References Cited

U.S. PATENT DOCUMENTS 10,135,835 B1 11/2018 Kandel et al.
10,250,395 B1 4/2019 Borne-Pons et al.
(Continued)

FOREIGN PATENT DOCUMENTS

CN 102137111 A 7/2011
CN 105488665 A 4/2016
(Continued)

OTHER PUBLICATIONS

Tencent Technology, WO, PCT/CN2021/090914, Jul. 30, 2021, 5 pgs.
(Continued)

*Primary Examiner* — Farid Homayounmehr
*Assistant Examiner* — Mudasiru K Olaegbe
(74) *Attorney, Agent, or Firm* — Morgan, Lewis & Bockius LLP

(57) ABSTRACT

A computing device receives network message data. The computing device determines a message processing type corresponding to the network message data. In accordance with a determination that the message processing type is a consensus processing type, the computing device obtains a consensus parameter corresponding to the network message data. In accordance with a determination that the consensus parameter does not meet a consensus validity condition, the computing device classifies the network processing message data as an invalid consensus message; and filters out the network message data.

19 Claims, 8 Drawing Sheets

(58) Field of Classification Search
CPC ............. H04L 63/1458; H04L 63/0227; H04L 63/102
See application file for complete search history.

(56) References Cited

U.S. PATENT DOCUMENTS

| | | | |
|---|---|---|---|
| 2016/0021126 A1* | 1/2016 | Vasseur | H04L 63/1416 726/23 |
| 2016/0224949 A1 | 8/2016 | Thomas et al. | |
| 2017/0075941 A1* | 3/2017 | Finlow-Bates | H04L 67/104 |
| 2017/0344435 A1* | 11/2017 | Davis | G06F 16/2379 |
| 2017/0344987 A1* | 11/2017 | Davis | G06F 16/24575 |
| 2019/0034465 A1* | 1/2019 | Shimamura | G06Q 20/02 |
| 2019/0238327 A1* | 8/2019 | Li | H04L 9/50 |
| 2019/0288993 A1* | 9/2019 | Lin | G06F 11/1441 |
| 2019/0386995 A1 | 12/2019 | Chafe et al. | |
| 2020/0059369 A1* | 2/2020 | Li | H04L 9/0643 |
| 2020/0136832 A1* | 4/2020 | Li | G06F 21/645 |
| 2020/0403776 A1* | 12/2020 | Oh | H04L 9/3247 |

FOREIGN PATENT DOCUMENTS

| | | |
|---|---|---|
| CN | 106060036 A | 10/2016 |
| CN | 107465693 A | 12/2017 |
| CN | 109756589 A | 5/2019 |
| CN | 110930578 A | 3/2020 |
| CN | 111343212 A | 6/2020 |

OTHER PUBLICATIONS

Tencent Technology, IPRP, PCT/CN2021/090914, Nov. 17, 2022, 6 pgs.
Tencent Technology, ISR, PCT/CN2021/090914, Jul. 30, 2021, 3 pgs.

* cited by examiner

BLOCKCHAIN-BASED MESSAGE PROCESSING METHOD AND APPARATUS, DEVICE, AND STORAGE MEDIUM

CROSS-REFERENCE TO RELATED APPLICATIONS

This application is a continuation application of PCT Patent Application No. PCT/CN2021/090914, entitled "BLOCKCHAIN-BASED MESSAGE PROCESSING METHOD AND APPARATUS, AND DEVICE AND STORAGE MEDIUM" filed on Apr. 29, 2021, which claims priority to Chinese Patent Application No. 202010438631.7, filed with the State Intellectual Property Office of the People's Republic of China on May 22, 2020, and entitled "MESSAGE PROCESSING METHOD AND DEVICE, EQUIPMENT AND STORAGE MEDIUM", all of which are incorporated herein by reference in their entirety.

FIELD OF THE TECHNOLOGY

This application relates to the field of blockchain technologies, and in particular, to a blockchain-based message processing method and apparatus, a computer device, and a computer-readable storage medium.

BACKGROUND OF THE DISCLOSURE

Blockchain network is a collection of a series of nodes that incorporate new blocks into a blockchain through consensus. A network formed by consensus nodes in the blockchain network may be referred to as a consensus network. A consensus mechanism in the consensus network can ensure that a latest block is accurately added to the blockchain, and that blockchain information stored by the nodes is consistent and non-forked, and can even resist malicious attacks.

In the related art, the consensus network can receive network messages transmitted by nodes (including a blockchain node in the blockchain network and a peripheral node outside the blockchain network), and after receiving a new network message, can perform service processing on the received network message. However, when the consensus network is attacked by a peripheral node, the peripheral node may transmit a large number of attack messages to the consensus network, causing accumulation of the large number of attack messages in the consensus network. Consequently, normal network messages in the consensus network are not processed in time or even timeout happens, and the consensus network may crash, further causing low processing efficiency of the normal network messages.

SUMMARY

Embodiments of this application provide a blockchain-based message processing method and apparatus, a computer device, and a non-transitory computer-readable storage medium, which can improve processing efficiency of network message data in a consensus network.

An embodiment of this application provides a blockchain-based message processing method, including:
  receiving network message data, and determining a message processing type corresponding to the network message data;
  obtaining a consensus parameter corresponding to the network message data in accordance with a determination that the message processing type is a consensus processing type; and
  in accordance with a determination that the consensus parameter does not meet a consensus validity condition, classifying the network message data as an invalid consensus message and filtering out the network message data.

An embodiment of this application further provides a blockchain-based message processing apparatus, including:
  a receiving module, configured to receive network message data, and obtain a message processing type corresponding to the network message data;
  an obtaining module, configured to obtain a consensus parameter corresponding to the network message data in accordance with a determination that the message processing type is a consensus processing type; and
  a filtering module, configured to filter out the network message data in accordance with a determination that the consensus parameter does not meet a consensus validity condition.

In the foregoing solution, the apparatus further includes:
  an adding module, configured to determine that the network message data is a valid consensus message in accordance with a determination that the consensus parameter meets the consensus validity condition, and performing consensus service processing on the valid consensus message,
the consensus parameter including message index information.

The apparatus further includes:
  a list obtaining module, configured to obtain a node committee list in a consensus network, the node committee list including a consensus node in a valid working state in the consensus network, and index information corresponding to the consensus node;
  a first condition determination module, configured to determine that the consensus parameter meets the consensus validity condition accordance with a determination that the message index information belongs to the index information corresponding to the consensus node included in the node committee list; and
  a second condition determination module, configured to determine that the consensus parameter does not meet the consensus validity condition in accordance with a determination that the message index information does not belong to the index information corresponding to the consensus node included in the node committee list.

The first condition determination module includes:
  a node obtaining unit, configured to obtain (e.g., identify) a first generation node corresponding to a transaction block with a target block height in the consensus network, and determine (e.g., identify) a second generation node corresponding to the network message data according to the message index information in accordance with a determination that the message index information belongs to the index information corresponding to the consensus node included in the node committee list; and
  a node position determination unit, configured to determine that the consensus parameter meets the consensus validity condition in accordance with a determination that the first generation node and the second generation node are adjacent consensus nodes in the node committee list.

The network message data includes block data, and the consensus parameter includes a block hash value corresponding to the block data.

The apparatus further includes:

a hash value obtaining module, configured to obtain a previous hash value corresponding to a transaction block with a target block height in the consensus network;

a third condition determination module, configured to determine that the consensus parameter meets the consensus validity condition in accordance with a determination that the block hash value is the same as the previous hash value; and a fourth condition determination module, configured to determine that the consensus parameter does not meet the consensus validity condition in accordance with a determination that the block hash value is different from the previous hash value.

The consensus parameter includes target pointer data.

The apparatus further includes:

a fifth condition determination module, configured to determine that the consensus parameter meets the consensus validity condition in accordance with a determination that memory information corresponding to the target pointer data in the network message data is valid memory; and a sixth condition determination module, configured to determine that the consensus parameter does not meet the consensus validity condition in accordance with a determination that the memory information corresponding to the target pointer data in the network message data is invalid memory.

The apparatus further includes:

a seventh condition determination module, configured to determine that the consensus parameter does not meet the consensus validity condition in accordance with a determination that the target pointer data in the network message data is null pointer data.

The apparatus further includes:

a times counting module, configured to determine (e.g., classify) network message data corresponding to the consensus parameter that does not meet the consensus validity condition as an attack message, obtain a transmission node corresponding to the attack message, and count a quantity of times of receiving the attack message associated with the transmission node; and a blacklist adding module, configured to add the transmission node to a blacklist in accordance with a determination that the quantity of receiving times is greater than or equal to a quantity threshold, the blacklist including nodes that have no network access authority.

The adding module is further configured to:

determine (e.g., classify) that the network message data is a valid consensus message in accordance with a determination that the consensus parameter meets the consensus validity condition, add the valid consensus message to a message processing set, and perform consensus service processing on the message processing set.

The message processing set includes a message queue.

The adding module includes:

a writing unit, configured to obtain the message queue in the consensus network, and write the valid consensus message into the message queue in sequence; and a message processing unit, configured to perform consensus service processing on the valid consensus message according to an arrangement order of the valid consensus message in the message queue.

The network message data includes a target proposal.

The adding module includes:

a verification unit, configured to obtain the target proposal from the message processing set, verify the target proposal, to obtain proposal voting information corresponding to the target proposal, and delete the target proposal from the message processing set;

a consensus result determination unit, configured to determine a consensus result of the target proposal according to the proposal voting information of the consensus node in the consensus network for the target proposal; and an accounting unit, configured to perform accounting on the consensus block included in the target proposal in accordance with a determination that the consensus result is that consensus is reached.

The apparatus further includes:

a type comparison module, configured to delete the network message data from the consensus network in accordance with a determination that the message processing type does not belong to the consensus processing type.

An embodiment of this application further provides a computer device, including: a memory and a processor, the memory storing a computer program, the computer program, when executed by the processor, causing the processor to perform the blockchain-based message processing method provided in the embodiments of this application.

An embodiment of this application further provides a non-transitory computer-readable storage medium, storing a computer program, the computer program including program instructions, the program instructions, when executed by a processor, causing the processor to perform the blockchain-based message processing method provided in the embodiments of this application.

According to the embodiments of this application, network message data is received and a message processing type corresponding to the network message data is obtained; a consensus parameter corresponding to the network message data is obtained in accordance with a determination that the message processing type is a consensus processing type; and the network message data is filtered out in accordance with a determination that the consensus parameter does not meet a consensus validity condition. It can be seen that when the network message data is received, the message processing type of the received network message data can be detected, and when the message processing type is the consensus processing type, network message data that does not meet the consensus validity condition is filtered out. According to the embodiments of this application, validity filtering of the received network message data is implemented, and network messages that do not meet the consensus validity condition are filtered out, so that the consensus node can process normal network messages in the consensus network in time, thereby improving processing efficiency of the network message data in the consensus network.

DESCRIPTION OF EMBODIMENTS

Figure 1:
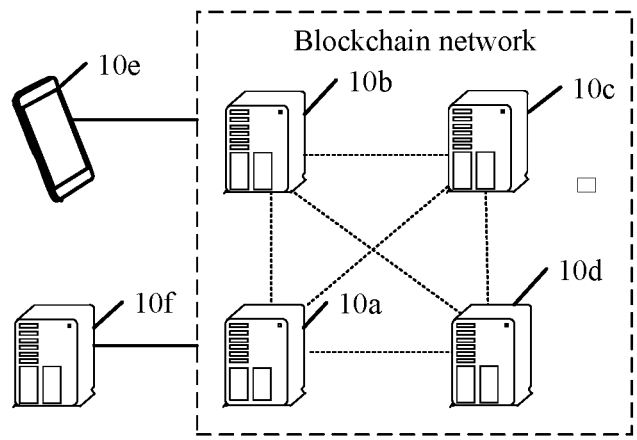
FIG. 1 is a diagram of a network architecture according to an embodiment of this application.

The technical solutions in the embodiments of this application are clearly and completely described in the following with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

In the following descriptions, the term "some embodiments" describes subsets of all possible embodiments, but it may be understood that "some embodiments" may be the same subset or different subsets of all the possible embodiments, and can be combined with each other without conflict.

In the following descriptions, the included term "first/second/third" is merely intended to distinguish similar objects but does not necessarily indicate a specific order of an object. It may be understood that "first/second/third" is interchangeable in terms of a specific order or sequence if permitted, so that the embodiments of this application described herein can be implemented in a sequence in addition to the sequence shown or described herein.

Before the embodiments of the present invention are further described in detail, nouns and terms related to the embodiments of the present invention are described, and the nouns and the terms related to the embodiments of the present invention are appropriate for the following explanations.

(1) A blockchain is a new application mode of computer technologies such as distributed data storage, point-to-point transmission (P2P transmission), a consensus mechanism, and an encryption algorithm. The blockchain is essentially a decentralized database and is a string of data blocks generated through association by using a cryptographic method. Each data block includes information of a batch of network transactions, the information being used for verifying the validity of information of the data block (anti-counterfeiting) and generating a next data block. The blockchain may include an underlying blockchain platform, a platform product service layer, and application service layer.

The underlying blockchain platform may include user management, basic service, smart contract, operation monitoring, and other processing modules. The user management module is responsible for management of identity information of all blockchain participants, including maintenance of public and private key generation (account management), key management, maintenance of a corresponding relationship between a real identity of a user and a blockchain address (authority management), and the like, and in an authorized case, supervises and audits transactions of some real identities, and provides rule configuration for risk control (risk control audit). The basic service module (e.g., a foundational module, a fundamental module, etc.) is deployed on all blockchain node devices to verify validity of a service request, and records a valid request to storage after completing consensus. For a new service request, the basic service module first performs adaptation parsing and authentication processing on an interface (interface adaptation), then encrypts service information through a consensus algorithm (consensus management), completely and consistently transmits the encrypted service information to a shared ledger (network communication), and records and stores the service information. The smart contract module is responsible for registration and issuance of a contract, as well as contract triggering and contract execution. A developer can define contract logic through a programming language, publish the contract logic to the blockchain (contract registration), according to the logic of contract terms, call a key or other events to trigger execution, complete the contract logic, and further provide functions of contract upgrade and cancellation. The operation monitoring module is mainly responsible for deployment, configuration modification, contract setting, cloud adaptation, and visual output of a real-time state of a product during operation, for example: alarming, monitoring a network status, or monitoring a node device health state.

A block in the blockchain may be generated by a blockchain node in a blockchain network. After the block is generated, the block may be added to the blockchain after a consensus node in the blockchain network completes consensus on the block based on a consensus mechanism. Consensus nodes in the blockchain network may form a consensus network. The consensus nodes can comprise all nodes in the blockchain network, or a subset of nodes (e.g., two or more nodes) in the blockchain network. The consensus network may be used for performing consensus verification on the block in the blockchain network, and performs accounting on the block after reaching consensus agreement.

(2) A ledger is a collective name of a blockchain (also referred to as ledger data) and a state database synchronized with the blockchain. The blockchain records a transaction in a form of a file in a file system. The state database records the transaction in the blockchain in forms of different types of key-value pairs, and is configured to support quick query of the transaction in the blockchain.

(3) Consensus is a process in the blockchain network, and is used for reaching consistency in transactions in blocks among a plurality of related nodes, and the consistent blocks are appended to a tail of the blockchain. A mechanism for reaching the consensus includes a proof of work (PoW), a proof of stake (PoS), a delegated proof of stake (DPoS), and a proof of elapsed time (PoET).

FIG. 1 is a diagram of a network architecture according to an embodiment of this application. As shown in FIG. 1, the network architecture may include a plurality of (that is, at least two) node devices. As shown in FIG. 1, the network architecture includes a node device 10a, a node device 10b, a node device 10c, a node device 10d in a blockchain network, and a peripheral node device 10e and a peripheral node device 10f outside the blockchain network. The node device 10a, the node device 10b, the node device 10c, and the node device 10d are all represented as blockchain nodes in the blockchain network. The blockchain nodes may include a consensus node and a synchronization node. The consensus node may share blockchain data in the blockchain network, and may participate in a block consensus process in the blockchain network. The synchronization node may share the blockchain data in the blockchain network, and has no authority to participate in the consensus process in the blockchain network. When the node device 10a, the node device 10b, the node device 10c, and the node device 10d are all consensus nodes, a network formed by the node device 10a, the node device 10b, the node device 10c, and the node device 10d may also be referred to as a consensus network. The peripheral node device 10e and the peripheral node device 10f refer to node devices outside the blockchain network, and the peripheral node devices may upload transaction data to the blockchain network in a form of network message data. The node devices in the blockchain network and the peripheral node devices outside the blockchain network may be terminal devices or servers, where the terminal devices may include a smartphone, a tablet computer, a laptop computer, a desktop computer, a palmtop computer, a mobile internet device (MID), a wearable device (such as a smart watch or a smart bracelet), and the like, but are not limited thereto. The server may be an independent physical server, or may be a server cluster including a plurality of physical servers or a distributed system, or may be a cloud server providing a cloud computing service. The terminal and the server may be directly or indirectly connected in a wired or wireless communication manner. This is not limited in this application.

Cloud computing refers to a delivery and use mode of IT infrastructure, and refers to obtaining required resources through a network in an on-demand and easy-to-expand manner. Cloud computing in a broad sense refers to a delivery and use mode of services, and refers to obtaining required services through the network in an on-demand and easy-to-expand manner. The services may be IT and software, Internet-related, or other services. Cloud computing is a product of development and integration of traditional computers and network technologies such as grid computing, distributed computing, parallel computing, utility computing, network storage technologies, virtualization, and load balance.

Cloud computing grows rapidly with development of the Internet, real-time data streaming, diversity of connection devices, and demands for searching service, social network, mobile commerce, and open collaboration. Different from parallel distributed computing in the past, emergence of cloud computing will promote revolutionary changes in an entire Internet model and an enterprise management model.

Any blockchain node in the blockchain network and peripheral node devices that have performed identity registration in the blockchain network may transmit a network message to the consensus network. The consensus network may be used for processing a consensus process in the blockchain network. That is, the consensus network may process received consensus messages (which may include a block proposal message and a voting message). For example, the consensus node in the consensus network may verify a block proposal included in the received block proposal message, to obtain voting information corresponding to the block proposal message. Certainly, each consensus node may broadcast its own voting information for the block proposal message as a voting message to the rest consensus nodes in the blockchain network. It may be understood that, after the consensus network receives the voting message, each consensus node may also determine a consensus result of the block proposal according to the received voting message. When the network message received by the consensus network does not belong to the consensus message, the consensus network may delete the received network message. For example, the consensus node in the consensus network detects that the network message is a transaction message after receiving the network message transmitted by the peripheral node device, and a message processing type corresponding to the transaction message is not a consensus processing type. In this case, the consensus node in the consensus network may filter out the received transaction message, such as deleting the transaction message, or skipping processing the transaction message. In this way, the consensus node in the consensus network filters the received network message to filter out network message that does not belong to the consensus message, thereby reducing a risk that the consensus network is attacked. In addition, because a quantity of processed network messages is reduced, the consensus node can process normal network messages in the consensus network in time, thereby improving processing efficiency of network message data in the consensus network.

Figure 2:
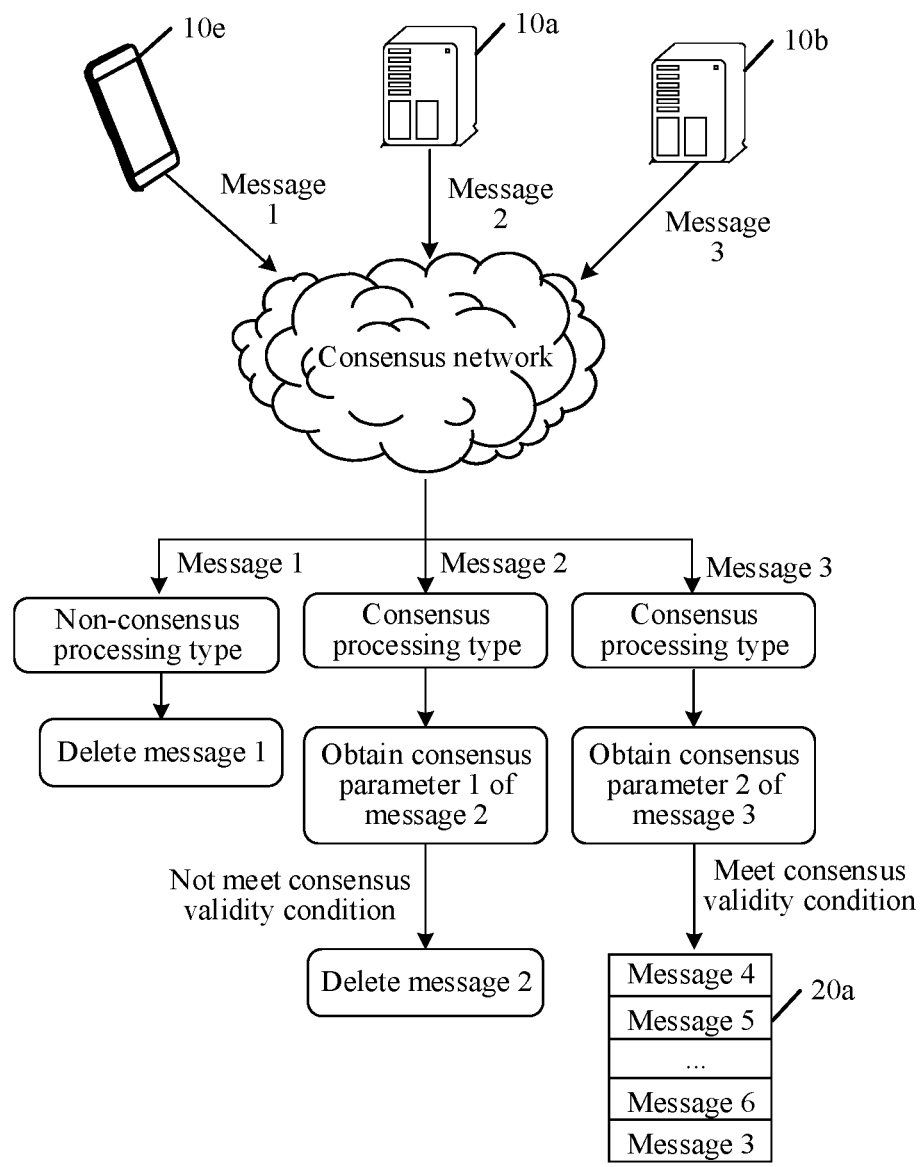
FIG. 2 is a schematic diagram of a blockchain-based message processing scenario according to an embodiment of this application.

FIG. 2 is a schematic diagram of a blockchain-based message processing scenario according to an embodiment of this application. Consensus nodes in a blockchain network may form a consensus network. The consensus network serves as the core of the blockchain network. Any consensus node in the consensus network may make consensus on a newly generated block in the blockchain network. After the consensus node in the consensus network reaches consensus on the block, a blockchain node may write a block on which consensus is reached into a ledger for disk falling processing. A node that generates a block in the blockchain network may broadcast the generated block in a form of a network message. In this way, all consensus nodes in the consensus network may obtain the block through a broadcast network message, verify the block, to obtain a voting result of the block, and then determine whether consensus is reached on the block according to the voting result corresponding to each consensus node. The block on which consensus is reached can be written into the ledger. The consensus network may receive a network message transmitted by any blockchain node or peripheral node (the peripheral node herein refers to a node device that has performed identity registration in the blockchain network, and the peripheral node does not belong to the blockchain network). After receiving the network message, any consensus node in the consensus network may verify the received network message, and the verified network message may be added to a message processing set, for the consensus network to process the network message included in the message processing set.

The following describes a network message processing process provided in this application by an example in which any consensus node in the consensus network implements a blockchain-based message processing method according to the embodiments of this application. As shown in FIG. 2, the peripheral node device 10e in the foregoing embodiment corresponding to FIG. 1 may transmit a message 1 to the consensus network, and the node device 10a may transmit a message 2 to a current consensus node in the consensus network (the current consensus node herein refers to a consensus node currently performing network message processing), and the node device 10b may transmit a message 3 to the current consensus node. When the node device 10a and the node device 10b are consensus nodes in the consensus network, the node device 10a may transmit the message 2 to the current consensus node by broadcasting. For example, the node device 10a broadcasts the message 2 in the blockchain network, so that the consensus nodes including the current consensus node in the blockchain network can receive the message 2. Similarly, the node device 10*b* transmitting the message 3 to the current consensus node may mean that the node device 10*b* broadcasts the message 3 in the blockchain network. Different node devices may transmit a network message to the current consensus node at the same time point, or may transmit a network message to the current consensus node at different time points. For example, the message 1, the message 2, and the message 3 may be network messages received by the current consensus node at the same time point, or the message 1, the message 2, and the message 3 may be network messages received by the current consensus node at different time points.

After receiving the message 1, the message 2, and the message 3, the current consensus node may verify all the received messages. For example, after receiving the message 1, the current consensus node may obtain a message type corresponding to the message 1. When the message type corresponding to the message 1 is a non-consensus processing type, it indicates that the current consensus node does not have a functional authority to process the message 1, and the current consensus node may delete the message 1. The consensus processing type is used for indicating the type of the message. A network message of the consensus processing type may also be referred to as a consensus message. Consensus processing may be performed on a message belonging to the consensus processing type by the consensus node in the consensus network. The non-consensus processing type refers to the rest message types that do not belong to the consensus processing type. The consensus node in the consensus network cannot process the message belonging to the non-consensus processing type. For example, if the message 1 is a transaction message transmitted by the peripheral node device 10*e*, the message type corresponding to the message 1 is the non-consensus processing type, and the consensus node may filter out the message 1. Similarly, after receiving the message 2 and the message 3, the current consensus node may respectively obtain message types respectively corresponding to the message 2 and the message 3. When the message types corresponding to the message 2 and the message 3 are both consensus processing types, the current consensus node obtains consensus parameters respectively corresponding to the message 2 and the message 3. For example, the consensus parameter corresponding to the message 2 is a consensus parameter 1, and the consensus parameter corresponding to the message 3 is a consensus parameter 2. The consensus parameters may include, but are not limited to: identification information of a message transmission node (also referred to as message index information), pointer data included in a message, block data included in the message, a block hash value in the block data, and an execution result of transaction data in the block data.

After respectively obtaining the consensus parameters corresponding to the message 2 and the message 3, the current consensus node may respectively perform validity detection on the consensus parameter 1 corresponding to the message 2 and the consensus parameter 2 corresponding to the message 3. When it is detected that the consensus parameter 1 does not meet a consensus validity condition, the current consensus node may determine (e.g., classify) the message 2 as an abnormal message (also referred to as an attack message), and filter out the message 2, such as skipping processing the message 2, or directly deleting the message 2 from the current consensus node. When it is detected that the consensus parameter 2 meets the consensus validity condition, the current consensus node may determine the message 3 as a valid consensus message, and add the message 3 to a message processing set 20*a*.

The consensus validity condition may include, but is not limited to that: identification information of the message transmission node belongs to a node committee (which may include consensus nodes in a valid working state in the blockchain network), pointer data included in a message has correctly allocated memory, and a block header of the block data included in the message includes a hash value of a previous block in the consensus network. The message processing set 20*a* may include valid consensus messages that are not processed in the consensus network. For example, the message processing set 20*a* may include the message 3, a message 4, a message 5, and a message 6. The valid consensus messages included in the message processing set 20*a* have an arrangement order, the arrangement order is associated with time at which a message is added to the message processing set 20*a*, and the arrangement order of the valid consensus messages may determine a processing order of the valid consensus messages. For example, if time at which the message 6 is added to the message processing set 20*a* is earlier than time at which the message 3 is added to the message processing set 20*a*, the message 6 may be located before the message 3, and time at which the current consensus node processes the message 6 needs to be earlier than time at which the current consensus node processes the message 3. It may be understood that messages included in the message processing set 20*a* are all filtered valid consensus messages. The current consensus node may directly read the valid consensus messages from the message processing set 20*a* according to the arrangement order, and perform data processing on the read valid consensus messages, thereby improving processing efficiency of the consensus messages.

Figure 3:
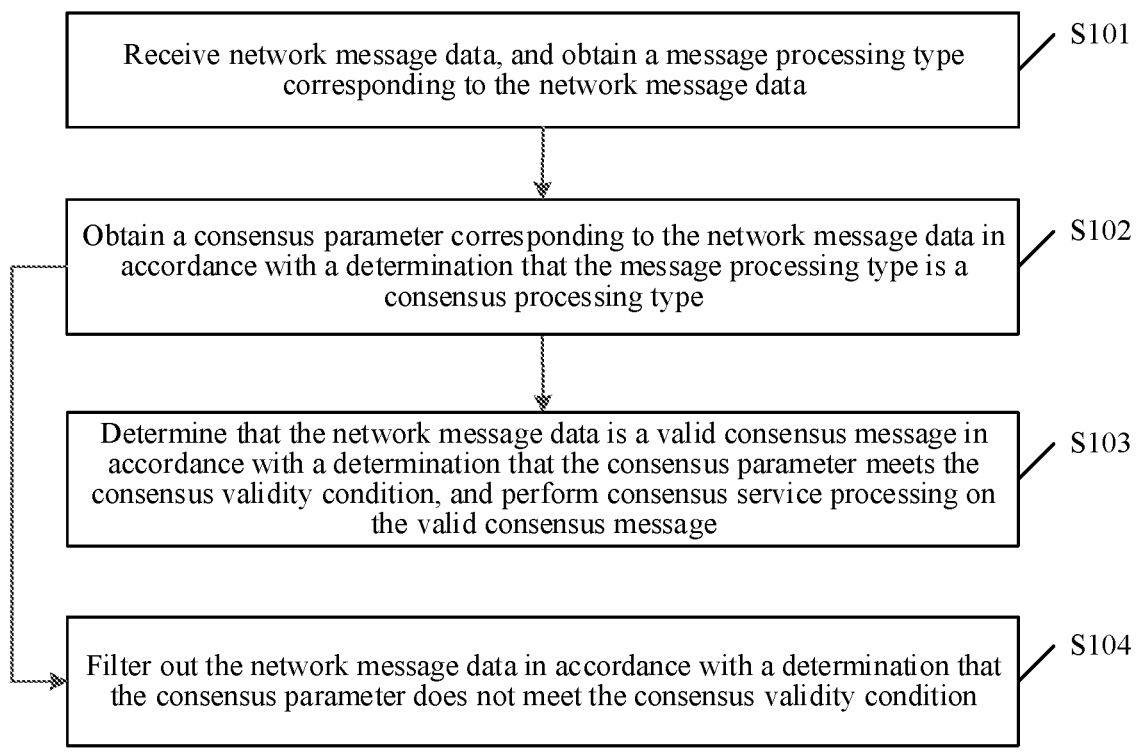
FIG. 3 is a schematic flowchart of a blockchain-based message processing method according to an embodiment of this application.

FIG. 3 is a schematic flowchart of a blockchain-based message processing method according to an embodiment of this application. It may be understood that the method may be performed by a consensus node in a consensus network (e.g., a computer device or a computer system), and the consensus node may be a node server in the consensus network, or another node device in the consensus network. As shown in FIG. 3, the blockchain-based message processing method may include the following steps:

Step S101. Receive network message data, and obtain a message processing type corresponding to the network message data.

In some embodiments, as a core network in a blockchain network, the consensus network may be used for performing a consensus process in the blockchain network. The consensus network may include a consensus node in the blockchain network. When the consensus network receives network message data transmitted by each node, the consensus node in the consensus network may filter the received network message data, select a valid consensus message from the received network message data, and filter out abnormal network message data. When the consensus network receives network message data transmitted by a node device, any consensus node in the consensus network may obtain the network message data (such as the message 1, the message 2, or the message 3 in the foregoing embodiment corresponding to FIG. 1), and obtain a message processing type corresponding to the network message data. In this case, a consensus node that obtains the message processing type may also be referred to as a current consensus node, and the current consensus node may continue to perform the subsequent message processing process.

The node device that transmits the network message data may refer to any blockchain node such as a synchronization node or a consensus node in the blockchain network, or a peripheral node, such as a user terminal or a client, that has performed identity registration in the blockchain network. The message processing type may be used for representing a message type of the network message data. The message processing type may include a transaction processing type, a consensus processing type, a heartbeat processing type, and the like. The transaction processing type may be used for representing a message type corresponding to transaction message data. The consensus processing type may be used for indicating a message type corresponding to consensus message data. The heartbeat processing type may be used for indicating a message type corresponding to heartbeat message data. Network message data of different message processing types may be executed by different node devices. For example, network message data belonging to the transaction processing type may be processed by any blockchain node in the blockchain network, network message data belonging to the heartbeat processing type may be processed by a node that has a heartbeat mechanism and receives the network message data, and network message data belonging to the consensus processing type may be processed by a consensus network. That is, the network message data belonging to the consensus processing type may be processed by the consensus node in the consensus network.

In some embodiments, messages of different message processing types have different message type formats, and the message processing type corresponding to the network message data may be determined according to the message type format. The network message data may further include field information used for representing the message processing type, and the message processing type corresponding to the network message data is determined according to the field information in the network message data (messages of different message processing types have different field information, and messages of the same message processing type have uniquely the same field information).

It may be understood that, before transmitting the network message data to the consensus network, a peripheral node may generate a key pair (which may include a public key and a private key) at the local peripheral node. The private key in the key pair may be managed by the peripheral node, and the private key may be used for generating a digital signature of the peripheral node. The public key in the key pair may be uploaded to the blockchain network, and the public key may be used for the blockchain node in the blockchain network to perform signature verification on message data uploaded by the peripheral node. After the peripheral node uploads the public key to the blockchain network, the peripheral node may obtain a blockchain account address, indicating that the peripheral node has completed identity registration in the blockchain network. After completing the identity registration, the peripheral node may transmit a network message to the blockchain network, and certainly can also transmit the network message to the consensus network in the blockchain network. The public key in the blockchain network is unique, and one public key corresponds to one node device.

Step S102. Obtain a consensus parameter corresponding to the network message data in accordance with a determination that the message processing type is a consensus processing type.

In some embodiments, because the consensus node in the consensus network may be used for performing a consensus process in the blockchain network, the consensus network may process the network message data of the consensus processing type, and the network message data other than the consensus processing type may be determined as abnormal messages. The consensus network may directly ignore a received abnormal message, or delete a received abnormal message. When obtaining the message processing type corresponding to the network message data, the current consensus node may determine whether the message processing type is the consensus processing type. If the message processing type is the consensus processing type, the current consensus node may obtain a consensus parameter corresponding to the network message data (which may be understood as attribute information corresponding to the network message data). If the message processing type does not belong to the consensus processing type, the network message data may be deleted from the consensus network. In other words, when the network message data belongs to a message of the consensus processing type, subsequent consensus service processing may be performed on the network message data, and when the network message data does not belong to the message of the consensus processing type, a processing process of the network message data is suspended, or the network message data is deleted.

When the network message data belongs to the message of the consensus processing type, the current consensus node may determine the network message data as the consensus message, and then the current consensus node may perform validity detection on the consensus message, verify the consensus parameter by obtaining the consensus parameter corresponding consensus message, and determine validity of the consensus message based on a verification result of the consensus parameter. The consensus parameter may refer to attribute information corresponding to the network message data belonging to the consensus processing type, a consensus process may be performed on the network message data belonging to the consensus processing type by the consensus node, and the consensus parameter may include at least one of message index information, message pointer data, message block data, block hash value in the message, various attribute data in the message (such as an assigned value, a default value, and a non-default value) belonging to the network message data of the consensus processing type, and the execution result of the transaction data in the message. For example, when the network message data received by the current consensus node is a consensus message including a target proposal, the current consensus node may obtain message index information carried in the network message data (the message index information is associated with a transmission node of the network message data, for example, the message index information may be node identification information corresponding to the transmission node of the network message data), obtain an execution result of transaction data included in block data in the target proposal, obtain a block hash value in a block header of the block data, obtain pointer data and the like in the network message data. The message index information, transaction execution result, block hash value, and pointer data may all be determined as the consensus parameters corresponding to the network message data.

Step S103. Determine that the network message data is a valid consensus message in accordance with a determination that the consensus parameter meets the consensus validity condition, and perform consensus service processing on the valid consensus message.

In some embodiments, after obtaining the consensus parameter corresponding to the network message data, the current consensus node needs to determine whether the consensus parameter meets the consensus validity condition in the consensus network. When the consensus parameter meets the consensus validity condition in the consensus network, the current consensus node may determine the network message data as a valid consensus message, and the current consensus node may perform consensus service processing on the valid consensus message. The consensus validity condition refers to a condition that the consensus message in the consensus network needs to meet. For example, the message index information is correct index information in a node committee list, the block data of the network message data includes a hash value of a previous block (which may be understood as a block with a maximum block height in the consensus network before receiving the network message data), and the pointer data included in the network message data has correctly allocated memory. When the valid consensus message is a proposal message, the consensus service processing may refer to a verification process of a proposal included in the proposal message and a process of generating voting information according to a verification result. When the valid consensus message is a voting message, the consensus service processing may refer to a verification process of voting information and an analysis and statistical process of the voting information.

In some embodiments, when the consensus parameter includes the message index information, the validity verification process of the consensus parameter may include: The current consensus node may obtain a node committee list in the consensus network, and the node committee list may include a consensus node in a valid working state in the consensus network, and index information corresponding to the consensus node in the valid working state. If the message index information belongs to the index information corresponding to the consensus node included in the node committee list, it is determined that the consensus parameter meets the consensus validity condition in the consensus network. If the message index information does not belong to the index information corresponding to the consensus node included in the node committee list, it is determined that the consensus parameter does not meet the consensus validity condition in the consensus network. Each network message data received by the current consensus node may carry corresponding message index information, and the message index information is associated with a transmission node of the network message data. That is, the message index information may be used for representing the transmission node of the network message data. When the message index information belongs to the node committee list, it indicates that the transmission node of the network message data corresponding to the message index information is the consensus node in the node committee list, and the network message data of the consensus processing type transmitted by the consensus node may be determined as meeting the consensus validity condition. When the message index information does not belong to the node committee list, it indicates that the transmission node of the network message data corresponding to the message index information is not the consensus node in the node committee list, and the network message data of the consensus processing type transmitted by the non-consensus node may be determined as not meeting the consensus validity condition. For example, the node committee list includes a consensus node 1 and index information A corresponding to the consensus node 1, a consensus node 2 and index information B corresponding to the consensus node 2, a consensus node 3 and index information C corresponding to the consensus node 3, and a consensus node 4 and index information D corresponding to the consensus node 4. When the message index information is C (C belongs to the node committee list), it may be determined that the consensus parameter meets the consensus validity condition. When the message index information is E (E does not belong to the node committee list), it may be determined that the consensus parameter does not meet the consensus validity condition. It may be understood that, after receiving the network message data, the current consensus node may further perform signature verification on the network message data according to the public key of the transmission node of the network message data. If the signature verification fails, it indicates that the consensus parameter does not meet the consensus validity condition.

In some embodiments, an arrangement order of the consensus nodes in the node committee list may be an order in which the consensus nodes pack blocks. That is, the consensus nodes in the blockchain network may pack the blocks according to the arrangement order in the node committee list. For example, when the arrangement order of the consensus nodes in the node committee list is: consensus node 1—consensus node 2—consensus node 3—consensus node 4, the consensus node 1 may collect transaction data in the blockchain network, and pack the collected transaction data into a block 1 with a block height of a. After the block 1 reaches consensus in the blockchain network, the consensus node 2 may collect transaction data in the blockchain network, and pack the collected transaction data into a block 2 with a height of a+1. By analogy, a new block is generated according to the arrangement order of the consensus nodes in the node committee list. Certainly, when the block 1 does not reach consensus in the blockchain network, the block 1 with the block height of a may be deleted, and the consensus node 2 may regenerate a block 3 with a block height of a. After reaching consensus, the block 3 is officially chained.

Therefore, when the network message data is a block proposal message, if the message index information of the network message data belongs to the index information corresponding to the consensus node included in the node committee list, the current consensus node may obtain a first generation node corresponding to a transaction block with a target block height in the consensus network, and determine a second generation node corresponding to the network message data according to the message index information. When the first generation node and the second generation node are adjacent consensus nodes in the node committee list, it may be determined that the consensus parameter meets the consensus validity condition, where the target block height refers to a maximum block height in the consensus network before the current consensus node receives the network message data. The current consensus node may determine a correct consensus node for generating a target proposal according to the arrangement order of the first generation node in the node committee list. If the second generation node corresponding to the block proposal message received by the current consensus node is the same as the correct consensus node, it indicates that the message index information carried in the network message data is correct, and it may be determined that the consensus parameter meets the consensus validity condition. If the second generation node corresponding to the block proposal message received by the current consensus node is different from the correct consensus node, it indicates that the message index information carried in the network message data is wrong, and it may be determined that the consensus parameter does not meet the consensus validity condition. As described in the foregoing example, if the first generation node corresponding to the transaction block with the target block height is the consensus node 2, and the second generation node corresponding to the block proposal message is the consensus node 3, it may be determined that the consensus parameter meets the consensus validity condition. If the second generation node corresponding to the block proposal message is the consensus node 4, it may be determined that the consensus parameter does not meet the consensus validity condition. If the first generation node corresponding to the transaction block with the target block height is the consensus node 4, when the second generation node corresponding to the block proposal message is the consensus node 1, it may be determined that the consensus parameter meets the consensus validity condition.

In some embodiments, when the network message data includes the block data, and the consensus parameter includes the block hash value corresponding to the block data, the validity verification process of the consensus parameter may include: The current consensus node may obtain a hash value of a previous block included in a block header of the block data of the network message data. In this case, the hash value of the previous block included in the block header may be referred to as the block hash value, and the current consensus node may further obtain a previous hash value corresponding to the transaction block with the target block height in the consensus network. If the block hash value is the same as the previous hash value (for example, the block hash value and the previous hash value are both b), it may be determined that the consensus parameter meets the consensus validity condition. If the block hash value is different from the previous hash value (for example, the block hash value is b, and the previous hash value is c), it may be determined that the consensus parameter does not meet the consensus validity condition. In other words, the current consensus node may detect whether the block data of the network message data includes the hash value of the transaction block with the target block height. If the hash value of the transaction block is included, it indicates that the consensus parameter meets the consensus validity condition. If the hash value of the transaction block is not included, it indicates that the consensus parameter does not meet the consensus validity condition.

In some embodiments, the consensus parameter may include attribute data included in the network message data, and the current consensus node may further perform validity check on the attribute data included in the network message data, for example, checking data such as a memory value, an assigned value, a default value, and a non-default value in the network message data. When there is no problem with the attribute data, the current consensus node may determine that the consensus parameter meets the consensus validity condition. When there is an error in any one of the attribute data, the current consensus node may determine that the consensus parameter does not meet the consensus validity condition.

In some embodiments, when the consensus parameter is target pointer data, the validity verification process of the consensus parameter may include: When it is detected that the network message data includes pointer data, the current consensus node may obtain target pointer data with a pointer data type from the network message data, and obtain memory information corresponding to the target pointer data. If the memory information corresponding to the target pointer data is valid memory, it may be determined that the consensus parameter meets the consensus validity condition. If the memory information corresponding to the target pointer data is invalid memory, it may be determined that the consensus parameter does not meet the consensus validity condition. If it is detected that the target pointer data is null pointer data, it may be determined that the consensus parameter meets the consensus validity condition. If the network message data carries the null pointer data, the consensus nodes in the entire consensus network may crash. Therefore, when it is detected that the network message data includes the null pointer data, it may be directly determined that the consensus parameter does not meet the consensus validity condition, the network message data is determined as an attack message, and the attack message is deleted from the consensus network. The valid memory corresponding to the pointer type data may be allocated in advance. If the target pointer data carried in the network message data is allocated with correct memory, it may be determined that the consensus parameter meets the consensus validity condition. If the target pointer data carried in the network message data is allocated with incorrect memory, it may be determined that the consensus parameter does not meet the consensus validity condition.

It may be understood that the consensus parameter in the embodiments of this application may include a variety of information. For example, the consensus parameter may include the message index information and the block hash value. In this case, the validity verification process of the consensus parameter may include a verification process of the message index information and a verification process of the block hash value. In accordance with a determination that the message index information belongs to the node committee list and the block hash value is the same as the previous hash value, the consensus parameter meets the consensus validity condition.

Figure 4:
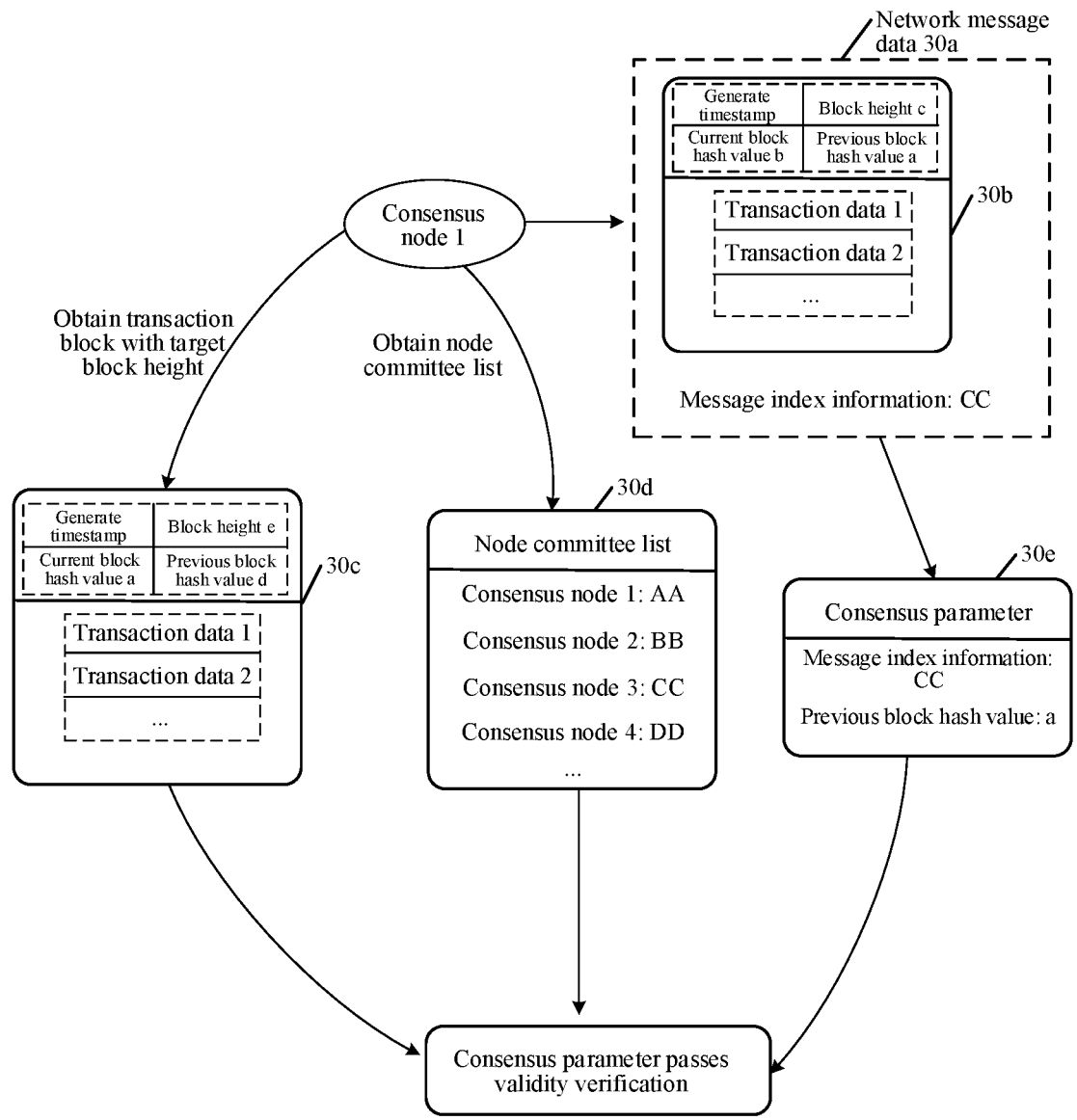
FIG. 4 is a schematic diagram of verifying a consensus parameter according to an embodiment of this application.

Referring to FIG. 4 together, FIG. 4 is a schematic diagram of verifying a consensus parameter according to an embodiment of this application. The validity verification process of the consensus parameter is described by using an example in which the consensus parameter includes the message index information and the block hash value. As shown in FIG. 4, after receiving network message data 30*a*, the consensus node 1 (the consensus node in this case is the current consensus node) detects that the message processing type of the network message data is the consensus processing type. The network message data 30*a* includes a block 30*b* and message index information CC. The block 30*b* may include a block header and a block body. The block header may include information such as a generation timestamp, a block height, and a hash value b corresponding to the block 30*b* (that is, the current block hash value), and a previous block hash value a. The block body may include a plurality of transaction data. After determining that the network message data 30*a* belongs to a message of the consensus processing type, the consensus node 1 may further obtain a consensus parameter 30*e* corresponding to the network message data 30*a*, and the consensus parameter 30*e* includes the message index information CC in the network message data 30*a*, and the previous block hash value a in the block header of the block 30*b*.

In order to verify validity of the consensus parameter 30*e*, the consensus node 1 may obtain a transaction block 30*c* with a target block height from the consensus network, where the transaction block 30*c* refers to a block with a maximum block height before the consensus node 1 obtains the block 30*b*, and obtain a hash value a of the transaction block 30*c* (a current block hash value in a block header of the transaction block 30*c*, which is the previous hash value) from the block header of the transaction block 30*c*. Therefore, the consensus node 1 may determine that the previous block hash value in the consensus parameter 30e is the same as the current hash value in the transaction block 30c, indicating that the transaction block 30c and the block 30b are adjacent blocks, and the previous block hash value in the consensus parameter 30e passes the verification. The consensus node 1 may further obtain a node committee list 30d from the consensus network. The node committee list 30d may include all valid consensus nodes included in the consensus network, and index information respectively corresponding to each valid consensus node. For example, the node committee list 30d may include nodes such as the consensus node 1, the consensus node 2, the consensus node 3, and the consensus node 4, and indexes such as index information AA of the consensus node 1, index information BB of the consensus node 2, index information CC of the consensus node 3, and index information DD of the consensus node 4. The message index information CC in the consensus parameter 30e is the same as the index information of the consensus node 3 in the node committee list 30d. That is, the message index information CC in the consensus parameter 30e belongs to the node committee list 30d, and it may be determined that the message index information CC in the consensus parameter 30e passes the verification. Therefore, it may be determined that the consensus parameter 30e passes the validity verification. That is, the consensus parameter 30e meets the consensus validity condition.

Figure 5:
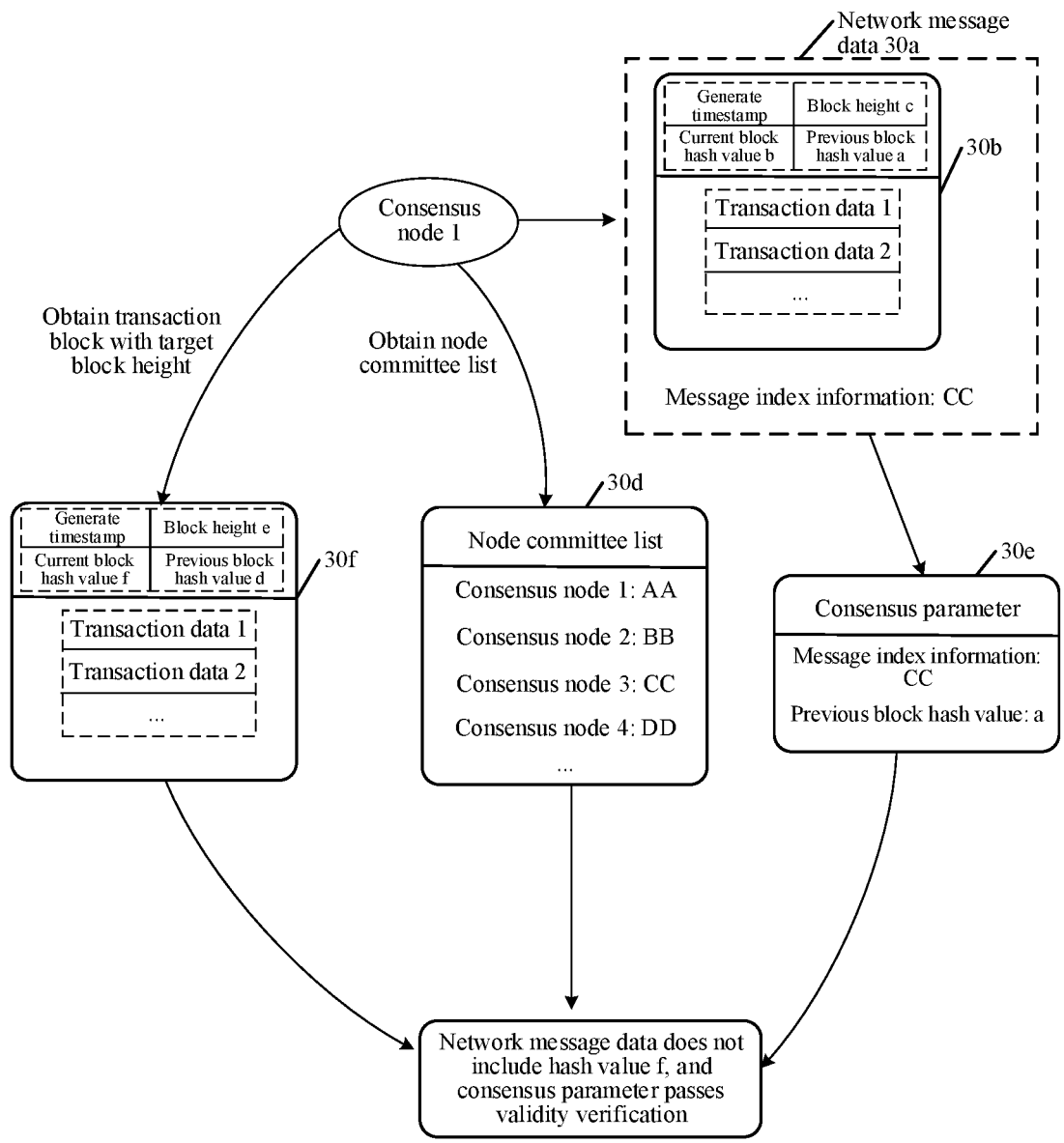
FIG. 5 is a schematic diagram of verifying a consensus parameter according to an embodiment of this application.

FIG. 5 is another schematic diagram of verifying a consensus parameter according to an embodiment of this application. As shown in FIG. 5, for the network message data 30a received by the consensus node 1 (the consensus node in this case is the current consensus node), the consensus parameter 30e corresponding to the network message data 30a, and the node committee list 30d in the consensus network, reference may be made to the foregoing embodiment corresponding to FIG. 4. Therefore, it may be determined that the message index information CC in the consensus parameter 30e passes the verification. If a block with the target block height obtained by the consensus node 1 is a transaction block 30f, and a current hash value in a block header of the transaction block 30f is f, that is, a hash value corresponding to the transaction block 30f is f (namely, the foregoing previous hash value), it may be determined that the previous block hash value a in the consensus parameter 30e is different from the hash value f corresponding to the transaction block 30f, and then it may be determined that the previous block hash value a in the consensus parameter 30e fails the verification. Therefore, the consensus parameter 30e fails the validity verification. That is, the consensus parameter 30e does not meet the consensus validity condition.

In some embodiments, if the current consensus node receives a large amount of network message data at a certain time point, it may cause an excessively large message reception amount of the current consensus node, and the current consensus node cannot process the received network message data, or even a consensus service processing process of the current consensus node may crash. Therefore, the current consensus node may create a message processing set. If the consensus parameter of the network message data meets the consensus validity condition, the network message data may be determined as a valid consensus message, and the valid consensus message is added to the message processing set. The current consensus node may obtain the valid consensus message from the message processing set for performing consensus service processing. In other words, the message processing set may be used for temporarily caching the valid consensus message received by the current consensus node, which can effectively reduce consensus service processing pressure of the current consensus node. The valid consensus message included in the message processing set may refer to a valid consensus message on which no consensus service processing has been performed. After the current consensus node obtains the valid consensus message from the message processing set and completes a consensus service processing process for the valid consensus message, the valid consensus message may be deleted from the message processing set.

In some embodiments, the message processing set may be a message queue. The current consensus node may obtain the message queue from the consensus network, write the valid consensus message into the message queue in order, and perform consensus service processing on the valid consensus message according to an arrangement order of the valid consensus message in the message queue. In some embodiments, when the message queue has not been created in the consensus network, the current consensus node may create a message queue and write the valid consensus message into the newly created message queue. Certainly, each consensus node in the consensus network may locally create a message queue for a user to cache the consensus message, and each consensus node may write the valid consensus message received by the consensus node into the message queue created by the consensus node. For example, the consensus network may include 3 consensus nodes, which are the consensus node 1, the consensus node 2 and the consensus node 3 respectively. The consensus node 1 may locally create a message queue 1, the consensus node 2 may locally create a message queue 2, and the consensus node 3 may locally create a message queue 3. When the consensus node 1 receives the network message data and detects that the network message data is a valid consensus message (the consensus node 1 in this case may be understood as the current consensus node), the consensus node 1 may write the valid consensus message into the message queue 1. When the consensus node 2 receives the network message data and detects that the network message data is a valid consensus message (the consensus node 2 in this case may be understood as the current consensus node), the consensus node 2 may write the valid consensus message into the message queue 2. When the consensus node 3 receives the network message data and detects that the network message data is a valid consensus message (the consensus node 3 in this case may be understood as the current consensus node), the consensus node 3 may write the valid consensus message into the message queue 3.

It may be understood that during creation of the message queue, parameters of the message queue may be set, and the parameters may include a maximum capacity of messages in the message queue (for example, the maximum capacity is 4 MB, which means that a capacity of messages added to the message queue cannot exceed 4 MB) and structure definition of a message (which may also be understood as a format of the message). For example, the message may be formed by a body and a variety of attributes, the body of the message may be formed by text and binary, and the body of the message may also be encrypted according to actual needs. The message queue may have a corresponding path. If there are a plurality of message queues, paths corresponding to each message queue may be different. When it is determined that the network message data is a valid consensus message, the current consensus node may write the valid consensus message into a message queue of a specified path.

The current consensus node may read the valid consensus message from the message queue, and perform consensus service processing on the read valid consensus message. When reading the valid consensus message from the message queue, the current consensus node may select the valid consensus message to read according to an arrangement order of the valid consensus message in the message queue. The arrangement order of the valid consensus message in the message queue may be determined according to time at which the valid consensus message is written into the message queue. The earlier the valid consensus message is written into the message queue, the higher order the valid consensus message is arranged in the message queue. The current consensus node may read the valid consensus message in an arrangement order from front to back. Alternatively, the arrangement order of the valid consensus message in the message queue may be determined by priority of the valid consensus message. The higher the priority, the higher order the valid consensus message is arranged in the message queue. The current consensus node may read the valid consensus message in an arrangement order from front to back. The priority may be associated with a valid message processing duration of the valid consensus message, and the like. For example, the shorter the valid message processing duration is, the higher priority the valid consensus message corresponds to. For example, if a valid message processing duration of a valid consensus message 1 is 5 minutes, and a valid message processing duration of a valid consensus message 2 is 10 minutes, in a message processing queue, the current consensus node may arrange the valid consensus message 1 before the valid consensus message 2. Time at which the current consensus node reads the valid consensus message 1 from the message queue is prior to time at which the current consensus node reads the valid consensus message 2. In other words, the current consensus node may preferentially perform consensus service processing on the valid consensus message 1.

Figure 6:
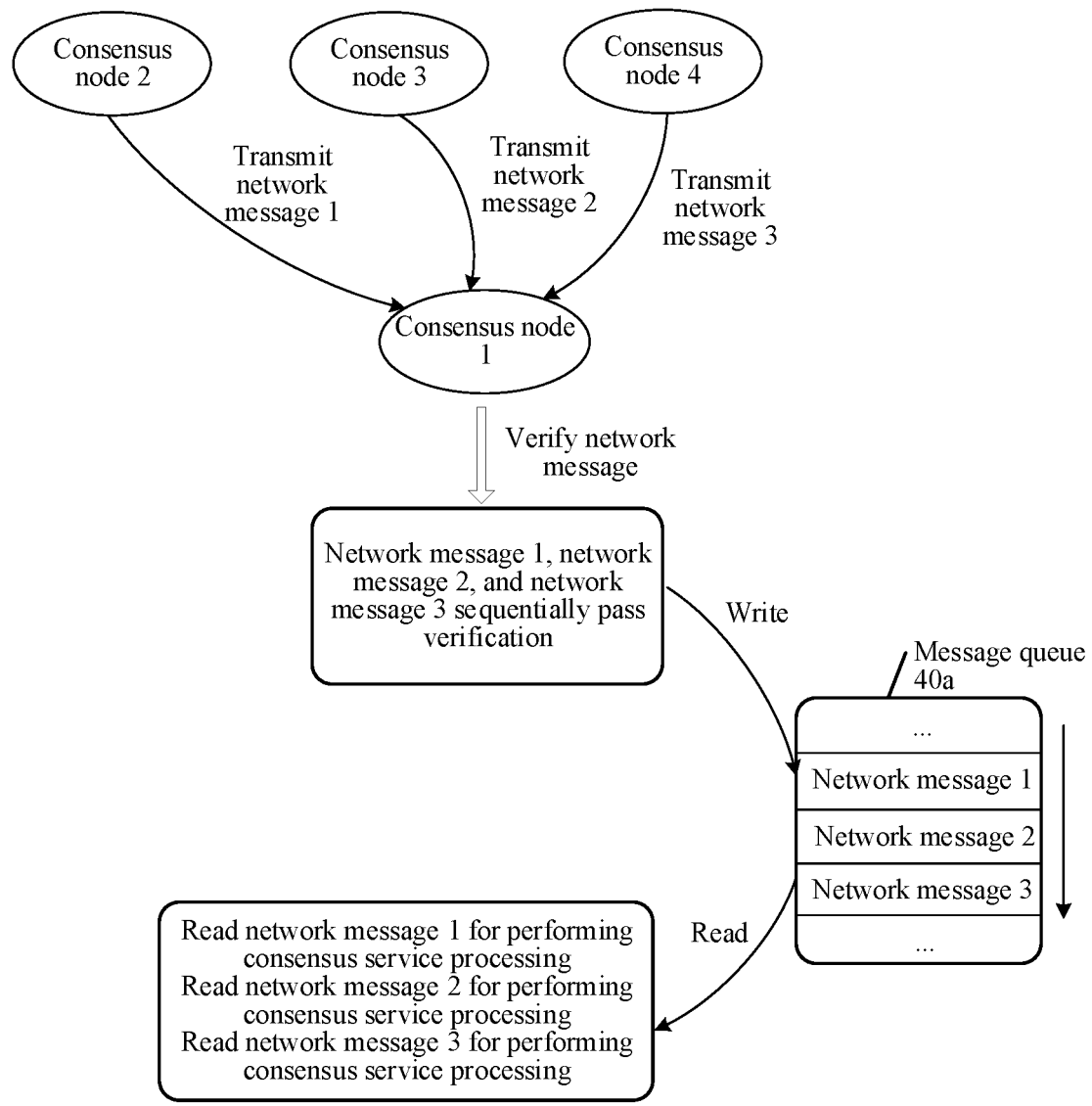
FIG. 6 is a schematic diagram of reading and writing a network message in a message queue according to an embodiment of this application.

Referring to FIG. 6 together, FIG. 6 is a schematic diagram of reading and writing a network message in a message queue according to an embodiment of this application. As shown in FIG. 6, a process of reading and writing the network message in the message queue is described by using the consensus node 1 as the current node. The consensus node 2, the consensus node 3, and the consensus node 4 may all transmit a network message to the consensus node 1. For example, the consensus node 2 transmits the network message 1 to the consensus node 1, the consensus node 3 transmits the network message 2 to the consensus node 1, and the consensus node 4 transmits the network message 3 to the consensus node 1. After receiving the network message 1, the network message 2, and the network message 3, the consensus node 1 may perform validity verification on the network message 1, the network message 2, and the network message 3. The network message passing the validity verification may be written into a message queue 40a. If the consensus node 1 sequentially completes verification processes on the network message 1, the network message 2, and the network message 3, and the network message 1, the network message 2, and the network message 3 all pass the validity verification, the network message 1, the network message 2, and the network message 3 may be sequentially written into the message queue 40a. After the network message 1, the network message 2, and the network message 3 are written into the message queue 40a, the consensus node 1 may read the network messages subsequently from the message queue 40a for performing consensus service processing. For example, the consensus node 1 may read the network message 1 from the message queue 40a. After completing the consensus service processing process on the network message 1, the consensus node 1 may continue to read the network message 2 from the message queue 40a. After completing the consensus service processing process on the network message 2, the consensus node 1 may continue to read the network message 3 from the message queue 40a for performing consensus service processing.

In some embodiments, when the network message data includes a target proposal and the network message data is a valid consensus message, the current consensus node may verify the target proposal, obtain proposal voting information corresponding to the target proposal, and delete the target proposal from the message processing set. That is, the current consensus node deletes the valid consensus message including the target proposal. A consensus result of the target proposal may be determined according to the proposal voting information of the target proposal by each consensus node in the consensus network. When the consensus result of the target proposal is that consensus is reached, accounting is processed on a consensus block included in the target proposal. That is, the consensus block on which consensus is reached is written into a ledger (blockchain) of the current consensus node. When the network message data includes a target proposal, the current consensus node may verify the target proposal. A verification process of the target proposal includes: a verification process of a consensus block included in the target proposal (verification of information such as a random number, a hash value, and transaction data in the consensus block) and verification of generation node information corresponding to the target proposal (such as state information of a generation node). The current consensus node may generate voting information according to a verification result of the target proposal. When the verification result is that the verification succeeds, the voting information of the current consensus node for the target proposal is an affirmative vote. When the verification result is that the verification fails, the voting information of the current consensus node for the target proposal is a negative vote, and the current consensus node may broadcast its own voting information in the blockchain network. Certainly, the current consensus node may alternatively obtain voting information for the target proposal broadcast by the rest consensus nodes, and then determine the consensus result of the target proposal according to the voting information of the rest consensus nodes and its own voting information. If a quantity of affirmative votes in voting information corresponding to all consensus nodes exceeds a threshold (for example, ⅔ of the quantity of the consensus nodes in the blockchain network), it may be determined that the consensus result of the target proposal is that consensus is reached, and accounting may be performed on the consensus block in the target proposal. If the quantity of affirmative votes in the voting information corresponding to all the consensus nodes does not exceed the threshold, it may be determined that the consensus result of the target proposal is that consensus fails, and accounting cannot be performed on the consensus block in the target proposal.

Step S104. Filter out the network message data in accordance with a determination that the consensus parameter does not meet a consensus validity condition.

In some embodiments, after the current consensus node completes the validity verification of the consensus parameter, if the consensus parameter does not meet the consensus validity condition in the consensus network, the network message data may be determined as an attack message, and the attack message may be filtered out from the consensus network. In actual implementation, filtering may be understood as not processing the attack message, such as skipping the attack message and continuing to detect validity of other network message data, or directly deleting the attack message.

In some embodiments, after determining that the network message data is an attack message, the current consensus node may obtain a transmission node corresponding to the attack message, count a quantity of times of receiving the attack message associated with the transmission node, and add the transmission node to a blacklist in accordance with a determination that the quantity of receiving times is greater than or equal to a quantity threshold (for example, 20 times). The blacklist includes nodes that have no network access authority. In other words, the current consensus node may count a quantity of times that the transmission node transmits the attack message. If the quantity of times of transmitting the attack message is excessively large, the transmission node may be added to the blacklist. Nodes added to the blacklist have no access authority to the consensus network. That is, the nodes in the blacklist cannot transmit a network message to the consensus network. In some embodiments, the current consensus node may count a quantity of times that the attack message transmitted by the transmission node is received within a target time range (such as 24 hours, or 1 hour, or a week). If the quantity of times exceeds a quantity threshold, the transmission node may be added to the blacklist.

Figure 7:
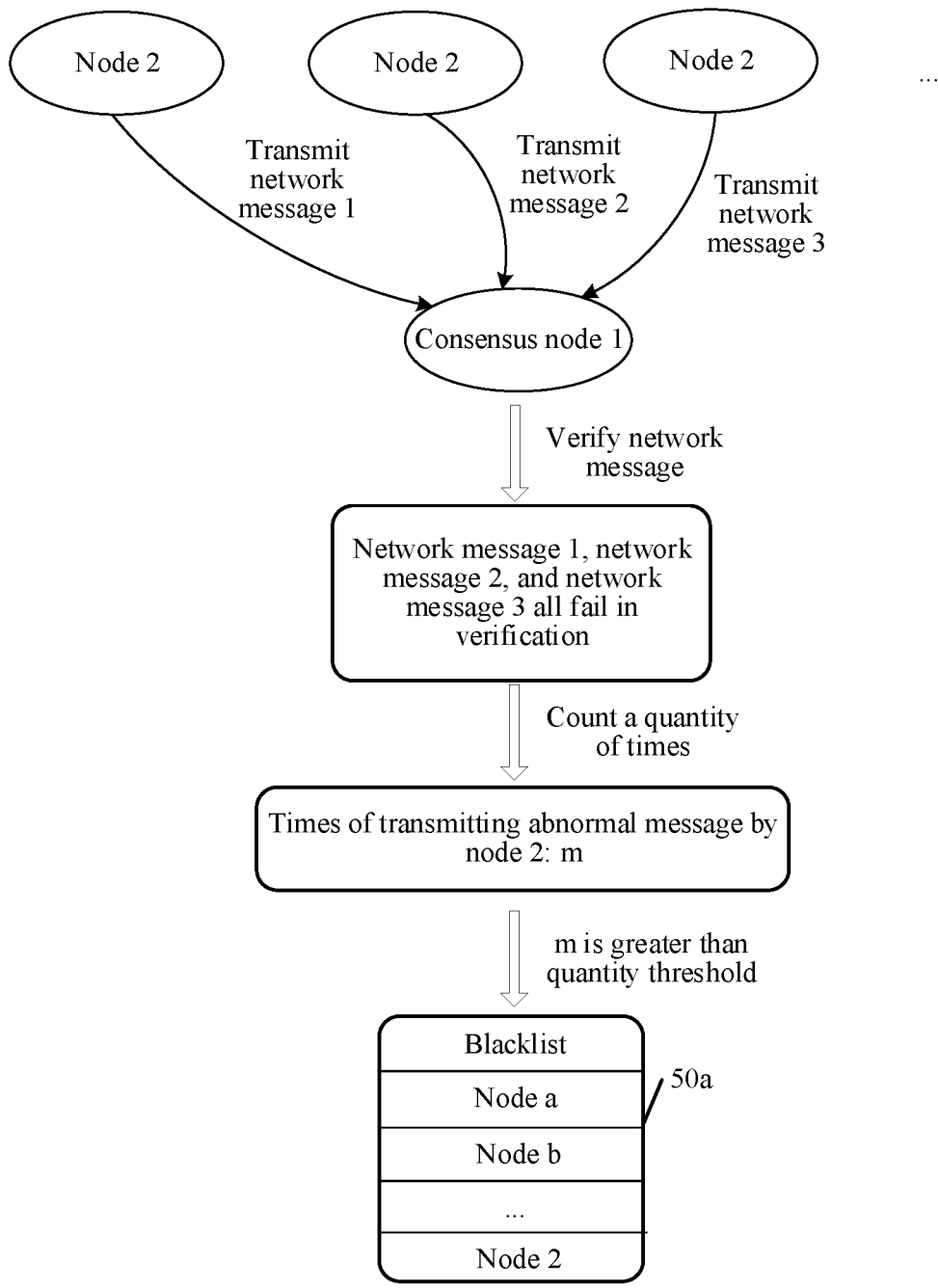
FIG. 7 is a schematic diagram of adding a node to a blacklist according to an embodiment of this application.

FIG. 7 is a schematic diagram of adding a node to a blacklist according to an embodiment of this application. As shown in FIG. 7, the node 2 may constantly transmit network messages to the consensus node 1. For example, the node 2 transmits messages such as the network message 1, the network message 2, and the network message 3 to the consensus node 1 within a certain period of time. After verifying the network message 1, the network message 2, and the network message 3, the consensus node 1 determines that the network message 1, the network message 2, and the network message 3 all fail in the verification. That is, the network message 1, the network message 2, and the network message 3 are all abnormal messages (also be referred to as attack messages). The consensus node 1 may count abnormal messages transmitted by the node 2. For example, when obtaining through counting that a quantity of the abnormal messages transmitted by the node 2 is m, and m is greater than a quantity threshold, the consensus node 1 may add the node 2 to a blacklist 50a. Any node added to the blacklist 50a cannot transmit a message to the consensus network.

According to the embodiments of this application, network message data is received and a message processing type corresponding to network message data is obtained; a consensus parameter corresponding to the network message data is obtained in accordance with a determination that the message processing type is a consensus processing type; and the network message data is determined as a valid consensus message in accordance with a determination that the consensus parameter meets a consensus validity condition, the valid consensus message is added to a message processing set, and consensus service processing is performed on the message processing set. The network message data is deleted in accordance with a determination that the consensus parameter does not meet the consensus validity condition. It can be seen that, when receiving the network message data, the consensus network can detect the message processing type of the received network message data; and when the message processing type is the consensus processing type, determine whether the network message data meets the consensus validity condition by determining whether the consensus parameter meets the consensus validity condition; and add the network message data that meets the consensus validity condition to the message processing set for service processing, and delete the network message data that does not meet the consensus validity condition from the consensus network. In other words, in the embodiments of this application, validity screening is implemented on the received network message data, to filter out the network message data that does not meet the consensus validity condition (such as attack messages), thereby reducing a risk that the consensus network is attacked, and improving processing efficiency of the consensus message in the consensus network.

Figure 8:
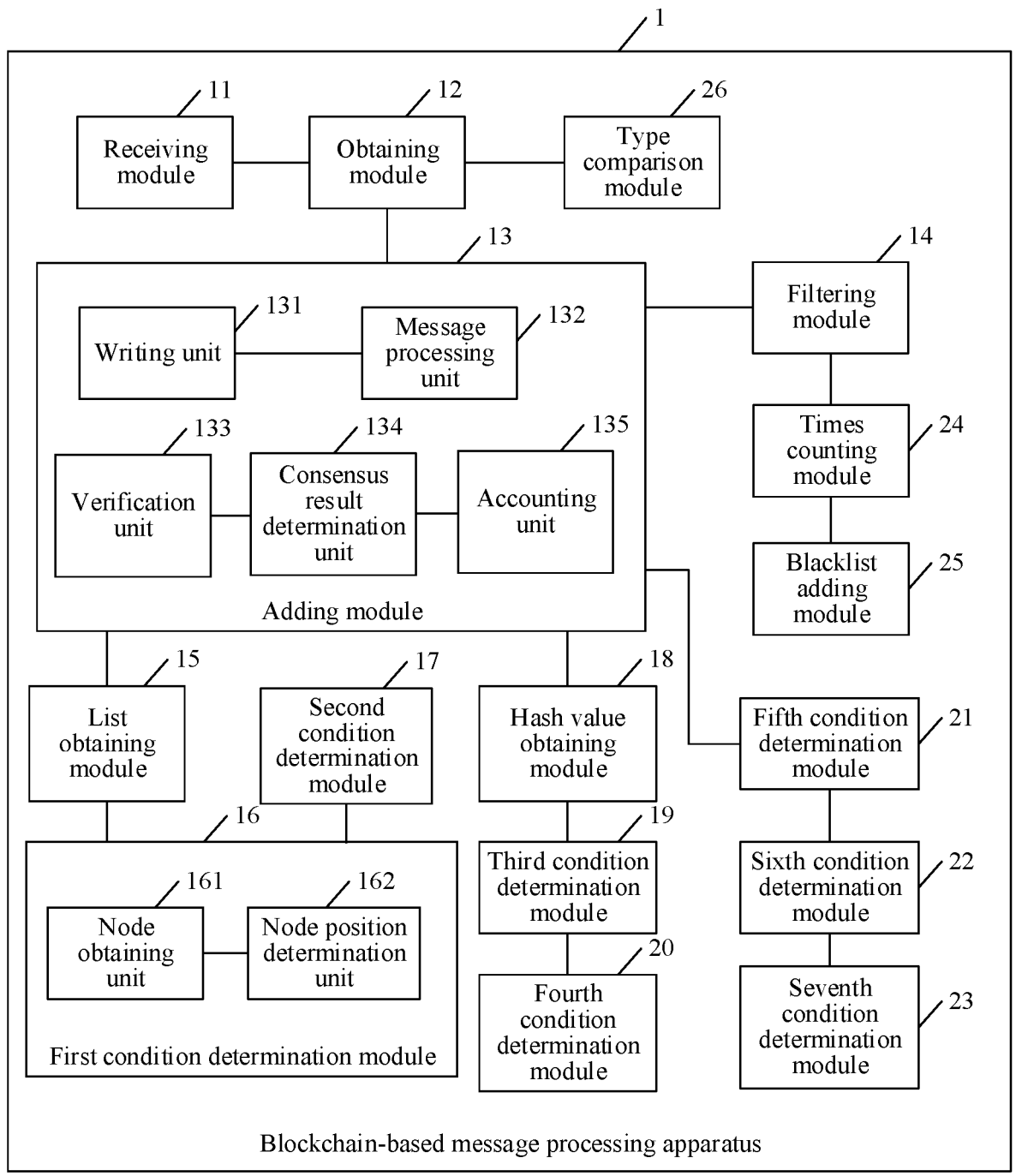
FIG. 8 is a schematic structural diagram of a blockchain-based message processing apparatus according to an embodiment of this application.

FIG. 8 is a schematic structural diagram of a blockchain-based message processing apparatus according to an embodiment of this application. The blockchain-based message processing apparatus may be implemented by software, such as a computer program (including a program code) running in a computer device. For example, the blockchain-based message processing apparatus is application software. Certainly, the apparatus may be implemented by using hardware, such as using a processor in a form of a hardware decoding processor, programmed to perform the blockchain-based message processing method provided in the embodiments of the application. For example, the processor in the form of a hardware decoding processor may use one or more application-specific integrated circuits (ASICs), a DSP, a programmable logic device (PLD), a complex programmable logic device (CPLD), a field-programmable gate array (FPGA), or other electronic components. In some embodiments, the apparatus may also be implemented by combination of software and hardware.

The apparatus may be configured to perform steps in the blockchain-based message processing method provided in the embodiments of this application. As shown in FIG. 8, the blockchain-based message processing apparatus 1 may include: a receiving module 11, an obtaining module 12, and a filtering module 14.

The receiving module 11 is configured to receive network message data, and obtain (e.g., determine) a message processing type corresponding to the network message data.

The obtaining module 12 is configured to obtain a consensus parameter corresponding to the network message data in accordance with a determination that the message processing type is a consensus processing type.

The filtering module 14 is configured to filter out the network message data in accordance with a determination that the consensus parameter does not meet a consensus validity condition.

In some embodiments, the apparatus further includes: an adding module 13, configured to determine that the network message data is a valid consensus message in accordance with a determination that the consensus parameter meets the consensus validity condition, and performing consensus service processing on the valid consensus message.

For functional implementations of the receiving module 11, the obtaining module 12, the adding module 13, and the filtering module 14, reference may be made to steps S101 to S104 in the foregoing embodiment corresponding to FIG. 3, and details are not described herein again.

Referring to FIG. 8 together, when the consensus parameter includes message index information, the blockchain-based message processing apparatus 1 may further include: a list obtaining module 15, a first condition determination module 16, and a second condition determination module 17.

The list obtaining module 15 is configured to obtain a node committee list in a consensus network, the node committee list including a consensus node in a valid working state in the consensus network, and index information corresponding to the consensus node.

The first condition determination module 16 is configured to determine that the consensus parameter meets the consensus validity condition in accordance with a determination that the message index information belongs to the index information corresponding to the consensus node included in the node committee list.

The second condition determination module 17 is configured to determine that the consensus parameter does not meet the consensus validity condition in accordance with a determination that the message index information does not belong to the index information corresponding to the consensus node included in the node committee list.

When the network message data includes block data, and the consensus parameter includes a block hash value corresponding to the block data, the blockchain-based message processing apparatus 1 may further include: a hash value obtaining module 18, a third condition determination module 19, and a fourth condition determination module 20.

The hash value obtaining module 18 is configured to obtain a previous hash value corresponding to a transaction block with a target block height in the consensus network.

The third condition determination module 19 is configured to determine that the consensus parameter meets the consensus validity condition in accordance with a determination that the block hash value is the same as the previous hash value.

The fourth condition determination module 20 is configured to determine that the consensus parameter does not meet the consensus validity condition in accordance with a determination that the block hash value is different from the previous hash value.

When the consensus parameter includes target pointer data, the blockchain-based message processing apparatus 1 may further include: a fifth condition determination module 21, a sixth condition determination module 22, and a seventh condition determination module 23.

The fifth condition determination module 21 is configured to determine that the consensus parameter meets the consensus validity condition in accordance with a determination that memory information corresponding to the target pointer data in the network message data is valid memory.

The sixth condition determination module 22 is configured to determine that the consensus parameter does not meet the consensus validity condition in accordance with a determination that the memory information corresponding to the target pointer data in the network message data is invalid memory.

The seventh condition determination module 23 is configured to determine that the consensus parameter does not meet the consensus validity condition in accordance with a determination that the target pointer data in the network message data is null pointer data.

For functional implementations of the list obtaining module 15, the first condition determination module 16, the second condition determination module 17, the hash value obtaining module 18, the third condition determination module 19, the fourth condition determination module 20, the fifth condition determination module 21, the sixth condition determination module 22 and the seventh condition determination module 23, reference may be made to step S103 in the foregoing embodiment corresponding to FIG. 3, and details are not described herein again.

Referring to FIG. 8 together, the blockchain-based message processing apparatus 1 may further include: a times counting module 24, a blacklist adding module 25, and a type comparison module 26.

The times counting module 24 is configured to determine network message data corresponding to the consensus parameter that does not meet the consensus validity condition as an attack message, obtain a transmission node corresponding to the attack message, and count a quantity of times of receiving the attack message associated with the transmission node.

The blacklist adding module 25 is configured to add the transmission node to a blacklist in accordance with a determination that the quantity of receiving times is greater than or equal to a quantity threshold, the blacklist including nodes that have no network access authority.

The type comparison module 26 is configured to delete the network message data from the consensus network in accordance with a determination that the message processing type does not belong to the consensus processing type.

For function implementations of the times counting module 24, the blacklist adding module 25, and the type comparison module 26, reference may be made to step S104 in the foregoing embodiment corresponding to FIG. 3. Details are not described herein again.

The adding module 13 is further configured to:

determine that the network message data is a valid consensus message in accordance with a determination that the consensus parameter meets the consensus validity condition, add the valid consensus message to a message processing set, and perform consensus service processing on the message processing set.

When the message processing set includes a message queue, the adding module 13 may include: a writing unit 131, and a message processing unit 132.

The writing unit 131 is configured to obtain the message queue in the consensus network, and write the valid consensus message into the message queue in sequence.

The message processing unit 132 is configured to perform consensus service processing on the valid consensus message according to an arrangement order of the valid consensus message in the message queue.

When the network message data includes a target proposal, the adding module 13 may include: a verification unit 133, a consensus result determination unit 134, and an accounting unit 135.

The verification unit 133 is configured to obtain the target proposal from the message processing set, verify the target proposal, to obtain proposal voting information corresponding to the target proposal, and delete the target proposal from the message processing set.

The consensus result determination unit 134 is configured to determine a consensus result of the target proposal according to the proposal voting information of the consensus node in the consensus network for the target proposal.

The accounting unit 135 is configured to perform accounting on the consensus block included in the target proposal in accordance with a determination that the consensus result is that consensus is reached.

For function implementations of the writing unit 131, the message processing unit 132, the verification unit 133, the consensus result determination unit 134, and the accounting unit 135, reference may be made to step S103 in the foregoing embodiment corresponding to FIG. 3, and details are not described herein again.

Referring to FIG. 8 together, the first condition determination module 16 may include: a node obtaining unit 161, and a node position determination unit 162.

The node obtaining unit 161 is configured to obtain a first generation node corresponding to a transaction block with a target block height in the consensus network, and determine a second generation node corresponding to the network message data according to the message index information in accordance with a determination that the message index information belongs to the index information corresponding to the consensus node included in the node committee list.

The node position determination unit 162 is configured to determine that the consensus parameter meets the consensus validity condition in accordance with a determination that the first generation node and the second generation node are adjacent consensus nodes in the node committee list.

For functional implementations of the node obtaining unit 161 and the node position determination unit 162, reference may be made to step S103 in the foregoing embodiment corresponding to FIG. 3, and details are not described herein again.

According to the embodiments of this application, network message data is received and a message processing type corresponding to network message data is obtained; a consensus parameter corresponding to the network message data is obtained in accordance with a determination that the message processing type is a consensus processing type; and the network message data is determined as a valid consensus message in accordance with a determination that the consensus parameter meets a consensus validity condition, the valid consensus message is added to a message processing set, and consensus service processing is performed on the message processing set. The network message data is deleted in accordance with a determination that the consensus parameter does not meet the consensus validity condition. It can be seen that, when receiving the network message data, the consensus network can detect the message processing type of the received network message data; and when the message processing type is the consensus processing type, determine whether the network message data meets the consensus validity condition by determining whether the consensus parameter meets the consensus validity condition; and add the network message data that meets the consensus validity condition to the message processing set for service processing, and filter out, such as skip or directly delete, the network message data that does not meet the consensus validity condition. In other words, in the embodiments of this application, validity screening is implemented on the received network message data, to filter out the network message data that does not meet the consensus validity condition (such as attack messages), thereby reducing a risk that the consensus network is attacked, and improving processing efficiency of the consensus message in the consensus network.

Figure 9:
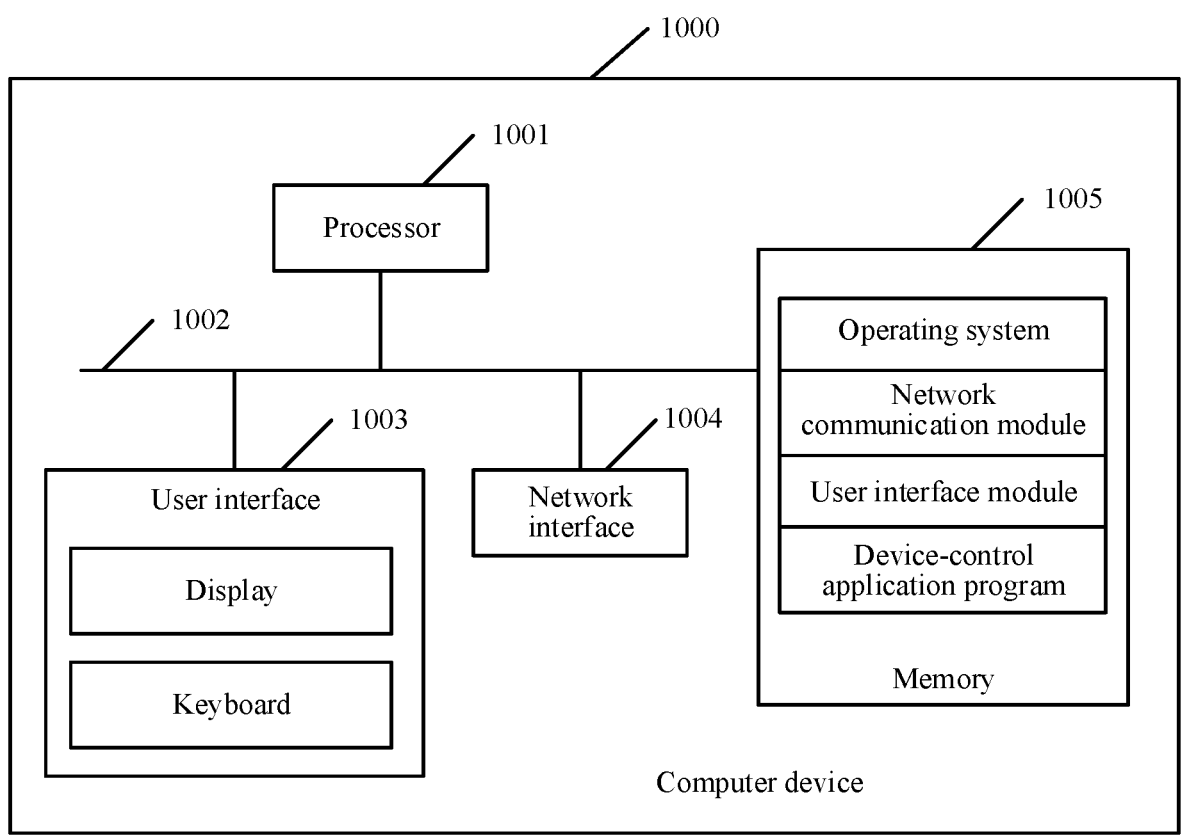
FIG. 9 is a schematic structural diagram of a computer device according to an embodiment of this application.

FIG. 9 is a schematic structural diagram of a computer device according to an embodiment of this application. As shown in FIG. 9, the computer device 1000 may include: a processor 1001, a network interface 1004, and a memory 1005. In addition, the computer device 1000 may further include: a user interface 1003 and at least one communication bus 1002. The communications bus 1002 is configured to implement connection communication between the components. The user interface 1003 may include a display and a keyboard. In some embodiments, the user interface 1003 may further include a standard wired interface and a standard wireless interface. The network interface 1004 may include a standard wired interface and a standard wireless interface (such as a Wi-Fi interface). The memory 1004 may be a high-speed RAM, or may be a non-volatile memory, for example, at least one magnetic disk memory. The memory 1005 may alternatively be at least one storage apparatus located away from the processor 1001. As shown in FIG. 9, the memory 1005 used as a computer-readable storage medium may include an operating system, a network communication module, a user interface module, and a device-control application program.

In the computer device 1000 shown in FIG. 9, the network interface 1004 may provide a network communication function, the user interface 1003 is mainly configured to provide an input interface for a user, and the processor 1001 may be configured to call a device-control application stored in the memory 1005, to implement:

receiving network message data, and obtaining a message processing type corresponding to the network message data;

obtaining a consensus parameter corresponding to the network message data in accordance with a determination that the message processing type is a consensus processing type;

determining that the network message data is a valid consensus message in accordance with a determination that the consensus parameter meets the consensus validity condition, adding the valid consensus message to a message processing set, and performing consensus service processing on the message processing set; and filtering out the network message data in accordance with a determination that the consensus parameter does not meet the consensus validity condition.

It may be understood that, the computer device 1000 described in the embodiments of this application can implement the descriptions of the blockchain-based message processing method in the embodiment corresponding to FIG. 3, or the descriptions of the blockchain-based message processing apparatus 1 in the embodiment corresponding to FIG. 8. Details are not described herein again. In addition, the description of beneficial effects of the same method is not described herein again.

In addition, an embodiment of this application further provides a non-transitory computer-readable storage medium. The computer-readable storage medium stores a computer program executed by the blockchain-based message processing apparatus 1 mentioned above, and the computer program includes program instructions. When executing the program instructions, the processor can perform the descriptions of the blockchain-based message processing method in the foregoing embodiment corresponding to FIG. 3. Therefore, details are not described herein again. In addition, the description of beneficial effects of the same method is not described herein again. For technical details that are not disclosed in the embodiments of the computer-readable storage medium of this application, refer to the method embodiments of this application. In an example, the program instruction may be deployed to be executed on a computing device, or deployed to be executed on a plurality of computing devices at the same location, or deployed to be executed on a plurality of computing devices that are distributed in a plurality of locations and interconnected through a communication network. The plurality of computing devices that are distributed in the plurality of locations and interconnected through the communication network may form a blockchain network.

A person of ordinary skill in the art needs to understand that all or a part of the processes of the method in the foregoing embodiment may be implemented by a program instructing relevant hardware. The program may be stored in a computer readable storage medium. When the program is run, the processes of the method in the foregoing embodiment are performed. The storage medium may be a magnetic disc, an optical disc, a read-only memory (ROM), or a random access memory (RAM).

What is disclosed above are merely exemplary embodiments of this application, and certainly are not intended to limit the scope of the claims of this application. Therefore, equivalent variations made in accordance with the claims of this application shall fall within the scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs message data filtering and/or condition determination. In practical application, the foregoing functions may be allocated to and completed by different functional modules according to requirements, that is, an inner structure of a device is divided into different functional modules to implement all or a part of the functions described above.

What is claimed is:

1. A blockchain-based message processing method, performed by a consensus node in a consensus network, the method comprising:
    receiving network message data;
    determining a message processing type corresponding to the network message data;
    in accordance with a determination that the message processing type is a consensus processing type, obtaining a consensus parameter corresponding to the network message data; and
    in accordance with a determination that the consensus parameter does not meet a consensus validity condition:
        identifying network message data corresponding to the consensus parameter that does not meet the consensus validity condition as an attack message;
        obtaining a transmission node corresponding to the attack message;
        counting a number of times of receiving the attack message associated with the transmission node;
        adding the transmission node to a blacklist in accordance with a determination that the number of times of receiving the attack message is greater than or equal to a quantity threshold, wherein the blacklist comprises nodes that have no network access authority; and
        filtering out the network message data.

2. The method according to claim 1, wherein the consensus parameter comprises message index information; the method further comprising:
    obtaining a node committee list in the consensus network, the node committee list comprising (i) a consensus node in a valid working state in the consensus network and (ii) index information corresponding to the consensus node;
    in accordance with a determination that the message index information belongs to the index information corresponding to the consensus node comprised in the node committee list:
        determining that the consensus parameter meets the consensus validity condition;
        classifying the network processing message data as a valid consensus message; and
        performing consensus service processing on the network message data; and
    in accordance with a determination that the message index information does not belong to the index information corresponding to the consensus node comprised in the node committee list, determining that the consensus parameter does not meet the consensus validity condition.

3. The method according to claim 2, wherein determining whether the consensus parameter meets the consensus validity condition comprises:
    obtaining a first generation node corresponding to a transaction block with a target block height in the consensus network;
    in accordance with a determination that the message index information belongs to the index information corresponding to the consensus node comprised in the node committee list, determining a second generation node corresponding to the network message data according to the message index information; and
    in accordance with a determination that the first generation node and the second generation node are adjacent consensus nodes in the node committee list, determining that the consensus parameter meets the consensus validity condition.

4. The method according to claim 1, wherein:
    the network message data comprises block data; and
    the consensus parameter comprises a block hash value corresponding to the block data; and
    the method further comprises:
        obtaining a previous hash value corresponding to a transaction block with a target block height in the consensus network;
        in accordance with a determination that the block hash value is the same as the previous hash value:
            determining that the consensus parameter meets the consensus validity condition; and
            performing consensus service processing on a valid consensus message; and
        in accordance with a determination that the block hash value is different from the previous hash value, determining that the consensus parameter does not meet the consensus validity condition.

5. The method according to claim 1, wherein:
the consensus parameter comprises target pointer data; and the method further comprises:
- in accordance with a determination that memory information corresponding to the target pointer data in the network message data is valid memory:
  - determining that the consensus parameter meets the consensus validity condition; and
  - performing consensus service processing on a valid consensus message; and
- in accordance with a determination that the memory information corresponding to the target pointer data in the network message data is invalid memory, determining that the consensus parameter does not meet the consensus validity condition.

6. The method according to claim 5, further comprising:
in accordance with a determination that the target pointer data in the network message data is null pointer data, determining that the consensus parameter does not meet the consensus validity condition.

7. The method according to claim 1, further comprising:
in accordance with a determination that the consensus parameter meets the consensus validity condition:
- determining that the network message data is a valid consensus message;
- adding the valid consensus message to a message processing set; and
- performing consensus service processing on the message processing set.

8. The method according to claim 7, wherein the message processing set comprises a message queue; and
adding the valid consensus message to a message processing set and performing consensus service processing on the message processing set comprises:
- obtaining the message queue in the consensus network;
- writing the valid consensus message into the message queue in sequence; and
- performing consensus service processing on the valid consensus message according to an arrangement order of the valid consensus message in the message queue.

9. The method according to claim 1, wherein the network message data comprises a target proposal; and the method further comprises:
in accordance with a determination that the consensus parameter meets the consensus validity condition:
- verifying the target proposal to obtain proposal voting information corresponding to the target proposal;
- deleting the target proposal from the message processing set;
- determining a consensus result of the target proposal according to the proposal voting information of the consensus node in the consensus network for the target proposal; and
- in accordance with a determination that the consensus result indicates a consensus is reached, performing accounting on the consensus block comprised in the target proposal.

10. The method according to claim 1, further comprising:
deleting the network message data from the consensus network in accordance with a determination that the message processing type does not belong to the consensus processing type.

11. A computer device, comprising:
one or more processors; and
memory storing one or more programs, the one or more programs comprising instructions that, when executed by the one or more processors, cause the one or more processors to perform operations comprising:
- receiving network message data;
- determining a message processing type corresponding to the network message data;
- in accordance with a determination that the message processing type is a consensus processing type, obtaining a consensus parameter corresponding to the network message data; and
- in accordance with a determination that the consensus parameter does not meet a consensus validity condition:
  - identifying network message data corresponding to the consensus parameter that does not meet the consensus validity condition as an attack message:
  - obtaining a transmission node corresponding to the attack message;
  - counting a number of times of receiving the attack message associated with the transmission node;
  - adding the transmission node to a blacklist in accordance with a determination that the number of times of receiving the attack message is greater than or equal to a quantity threshold, wherein the blacklist comprises nodes that have no network access authority; and
  - filtering out the network message data.

12. The computer device according to claim 11, wherein the consensus parameter comprises message index information; the operations further comprising:
- obtaining a node committee list in the consensus network, the node committee list comprising (i) a consensus node in a valid working state in the consensus network and (ii) index information corresponding to the consensus node;
- in accordance with a determination that the message index information belongs to the index information corresponding to the consensus node comprised in the node committee list:
  - determining that the consensus parameter meets the consensus validity condition;
  - classifying the network processing message data as a valid consensus message; an
  - performing consensus service processing on the network message data; and
- in accordance with a determination that the message index information does not belong to the index information corresponding to the consensus node comprised in the node committee list, determining that the consensus parameter does not meet the consensus validity condition.

13. The computer device according to claim 12, wherein determining whether the consensus parameter meets the consensus validity condition comprises:
- obtaining a first generation node corresponding to a transaction block with a target block height in the consensus network;
- in accordance with a determination that the message index information belongs to the index information corresponding to the consensus node comprised in the node committee list, determining a second generation node corresponding to the network message data according to the message index information; and
- in accordance with a determination that the first generation node and the second generation node are adjacent consensus nodes in the node committee list, determining that the consensus parameter meets the consensus validity condition.

14. The computer device according to claim 11, wherein:

the network message data comprises block data; and the consensus parameter comprises a block hash value corresponding to the block data; and the operations further comprise:

obtaining a previous hash value corresponding to a transaction block with a target block height in the consensus network;

in accordance with a determination that the block hash value is the same as the previous hash value:

determining that the consensus parameter meets the consensus validity condition; and performing consensus service processing on a valid consensus message; and in accordance with a determination that the block hash value is different from the previous hash value, determining that the consensus parameter does not meet the consensus validity condition.

15. The computer device according to claim 11, wherein:

the consensus parameter comprises target pointer data; and the operations further comprise:

in accordance with a determination that memory information corresponding to the target pointer data in the network message data is valid memory:

determining that the consensus parameter meets the consensus validity condition; and performing consensus service processing on a valid consensus message; and in accordance with a determination that the memory information corresponding to the target pointer data in the network message data is invalid memory, determining that the consensus parameter does not meet the consensus validity condition.

16. The computer device according to claim 15, the operations further comprising:

in accordance with a determination that the target pointer data in the network message data is null pointer data, determining that the consensus parameter does not meet the consensus validity condition.

17. A non-transitory computer-readable storage medium, storing a computer program, the computer program, when executed by one or more processors of a computer device, cause the one or more processors to perform operations comprising:

receiving network message data;

determining a message processing type corresponding to the network message data;

in accordance with a determination that the message processing type is a consensus processing type, obtaining a consensus parameter corresponding to the network message data; and in accordance with a determination that the consensus parameter does not meet a consensus validity condition:

identifying network message data corresponding to the consensus parameter that does not meet the consensus validity condition as an attack message;

obtaining a transmission node corresponding to the attack message;

counting a number of times of receiving the attack message associated with the transmission node;

adding the transmission node to a blacklist in accordance with a determination that the number of times of receiving the attack message is greater than or equal to a quantity threshold, wherein the blacklist comprises nodes that have no network access authority; and filtering out the network message data.

18. The non-transitory computer-readable storage medium according to claim 17, wherein the network message data comprises a target proposal; and the operations further comprise:

in accordance with a determination that the consensus parameter meets the consensus validity condition:

verifying the target proposal to obtain proposal voting information corresponding to the target proposal;

deleting the target proposal from the message processing set;

determining a consensus result of the target proposal according to the proposal voting information of the consensus node in the consensus network for the target proposal; and in accordance with a determination that the consensus result indicates a consensus is reached, performing accounting on the consensus block comprised in the target proposal.

19. The non-transitory computer-readable storage medium according to claim 17, the operations further comprising:

deleting the network message data from the consensus network in accordance with a determination that the message processing type does not belong to the consensus processing type.

* * * * *